March 22, 1949. J. DANA 2,465,068
FILTER FOR FLASH LAMPS
Filed Feb. 5, 1945 2 Sheets-Sheet 1
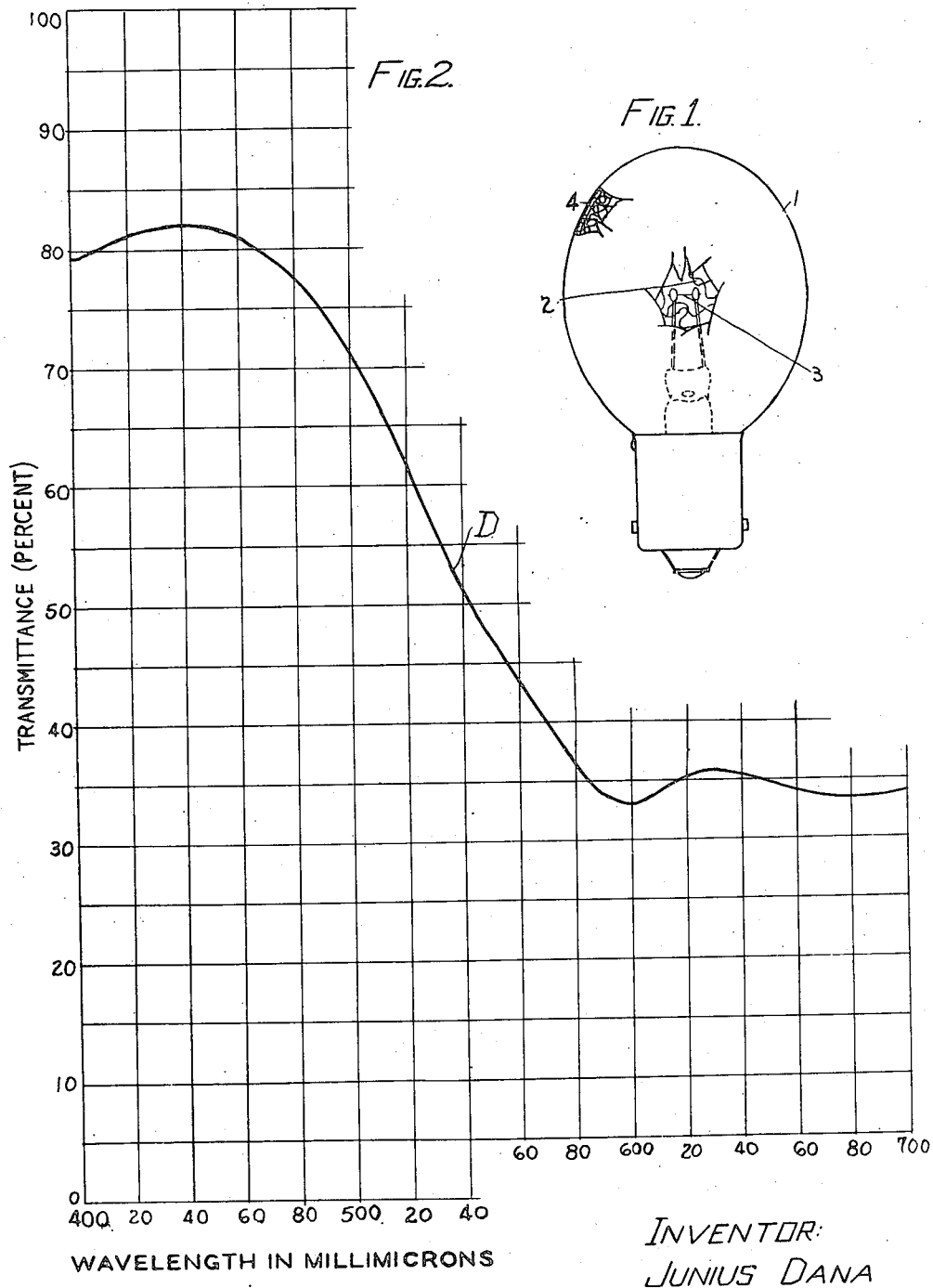
INVENTOR:
JUNIUS DANA
BY John H Henderson
HIS ATTORNEY

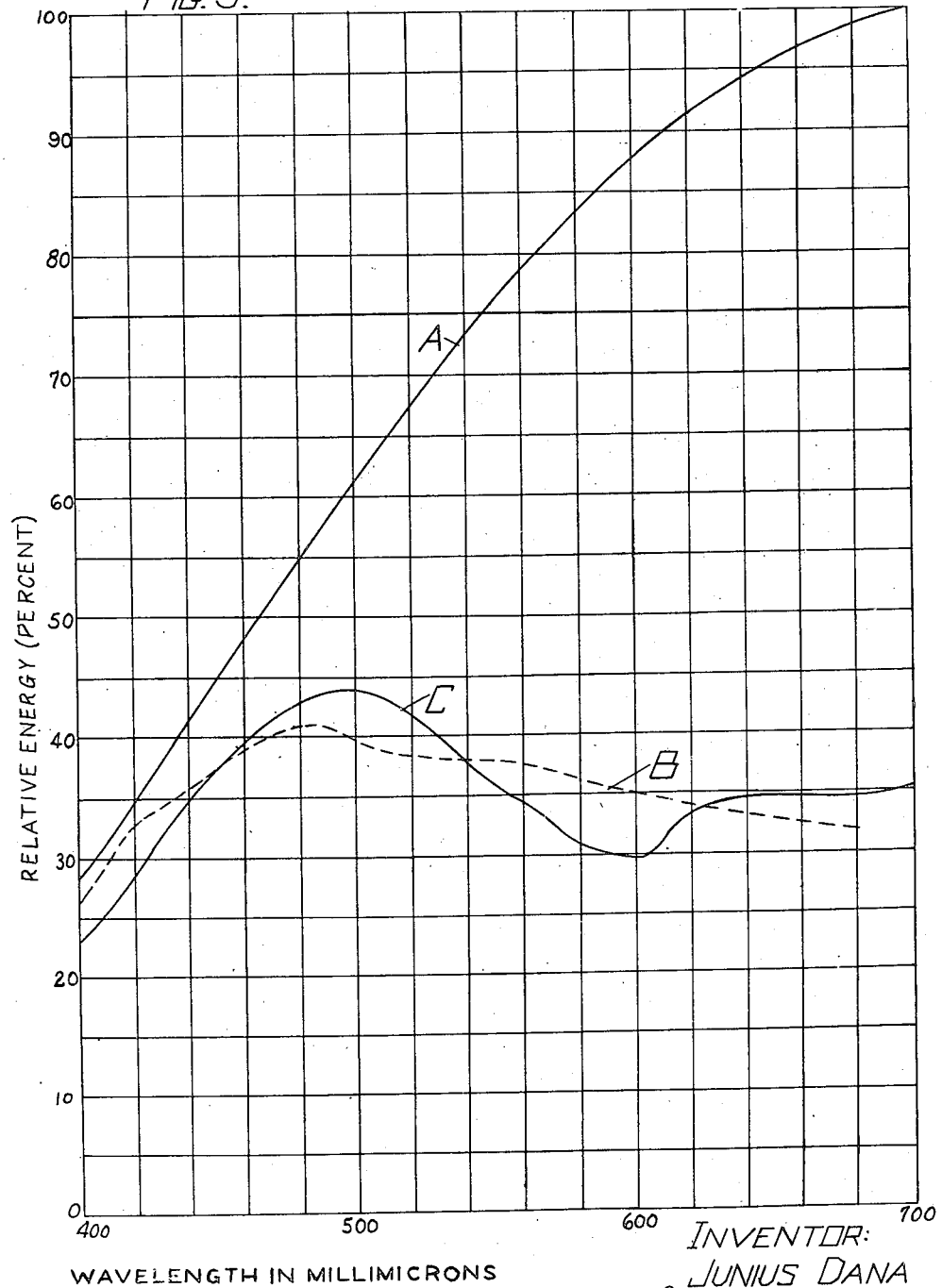

Patented Mar. 22, 1949

2,465,068

UNITED STATES PATENT OFFICE 2,465,068

FILTER FOR FLASH LAMPS

Junius Dana, University Heights, Ohio, assignor to General Electric Company, a corporation of New York Application February 5, 1945, Serial No. 576,329

7 Claims. (Cl. 67—31)

This invention relates to filters for photographic flash lamps, and more particularly to filters for use with photoflash lamps to transform the light therefrom to daylight character.

An object of this invention is to provide a filter which will transform the light from photoflash lamps to a character such that it will be satisfactory for color photography when using daylight color film. Another object is to provide a filter having that characteristic, as well as high transmission of photographically useful light.

Although filters have been used heretofore in connection with photoflash lamps for color photography, their characteristics have been such that they were suitable only for supplementing natural daylight. In other words, lamps with such filters did not give satisfactory results when used as the sole source of illumination. This was propably due to the fact that such filters were designed to transform the light of the clear flash lamp to light having a color temperature corresponding to a black body curve.

According to the present invention, the filtered light closely approximates average daylight, which is a mixture of sunlight and skylight. Its color temperature is approximately 6000° K. but it is not a black body curve. Further features and advantages of my invention will appear from the following description of species thereof and from the drawing.

In the drawing, Fig. 1 is an elevation of a photoflash lamp comprising my invention; Fig. 2 is a transmission curve of a filter comprising my invention; and Fig. 3 shows plots of relative energy against wavelength for a clear photoflash lamp, for average daylight, and for filtered light according to this invention.

The photoflash lamp shown in Fig. 1 comprises a bulb 1 of suitable transparent material, such as glass, containing a flash producing charge of suitable material 2, such as the shredded foil disclosed and claimed in Patent 2,351,290, F. J. Rippl et al. The lamp also contains the usual ignition filament 3 coated with a fulminant, and a filling of oxygen.

The filter comprising the present invention is preferably applied as a coating 4 on the exterior surface of the bulb 1. However, it may be applied to the inner surface of the bulb, if desired.

The curve A in Fig. 3 is the plot of relative energy against wavelength in millimicrons for a clear photoflash lamp having a color temperature of 3800° K. The dotted line curve B represents average daylight, which is a mixture of sunlight and skylight, and which may be taken as the ideal. The curve C represents the plot of relative energy from a photoflash lamp at 3800° K. which possesses a 1.8 mil thick dry film of a filter made in accordance with my invention. The curve D in Fig. 2 is a plot of percent transmittance against wavelength in millimicrons for such a filter.

A filter comprising my invention contains a blue color material and a violet color material. The blue color material is preferably an iron blue pigment, preferably Prussian Blue having its maximum transmittance at about 440 millimicrons or less. Satisfactory pigments of that type are Prussian Blue B–140–DL–258 marketed by E. I. du Pont de Nemours and Company, of Wilmington, Delaware, and Prussian Blue A–4429 marketed by Imperial Color Works, of Glens Falls, New York. The violet color material is preferably a Methyl Violet dye.

A suitable formula for a lacquer comprising my invention is as follows:

A 15% clear cellulose acetate solution is prepared by dissolving:

| | Grams |
|---|---|
| Cellulose acetate (grade E–309 Eastman Kodak) | 1,000 |
| Denatured alcohol | 560 |
| Ethyl lactate | 720 |
| Acetone | 4,400 |

The blue color stock solution is prepared as follows:

| | Grams |
|---|---|
| Prussian Blue | 3 |
| Ethyl lactate | 100 |

Grind 16 hours in 1 qt. ballmill,

Add 15% clear cellulose acetate solution (above) _____ 200

Grind one hour.

The violet color stock solution is prepared by dissolving and filtering:

| | | |
|---|---|---|
| Methyl Violet | gms | 0.1 |
| Methyl alcohol | cc | 100 |

The ingredients are then mixed in the following proportions:

| | Grams |
|---|---|
| Blue color stock solution (above) | 20 |
| Methyl Violet stock solution (above) | 6 |
| 15% cellulose acetate solution (above) | 380 |

The lacquer prepared as described above may then be applied to the bulb to form a coating, preferably about 1.8 mil thick when dry. This lacquer is virtually unaffected by humidity, that is, the shape of the transmission curve is unaffected. This is in contrast to some lacquers heretofore employed.

The above lacquer solution contains about 0.05%, by weight, of color material, there being about 0.36% of color material in the dry film. The color ingredients are present in the proportions of about 3.7% by weight of Methyl Violet and 96.3% of Prussian Blue, that is, about 25 parts Prussian Blue to one part Methyl Violet.

Referring to the curve D in Fig. 2, it will be observed that the filter according to the invention has a maximum transmittance (around 80 per cent) for light of a wave-length in the region of 450 millimicrons and a transmittance for longer wave-length light gradually decreasing in more or less uniform manner to a value of around 35 per cent in the region of 600 millimicrons and then substantially leveling off at a more or less uniform value of around 35 per cent transmittance beyond the region of 600 millimicrons, i. e., from 600 to 700 millimicrons. It will be observed that in the region immediately beyond 600 millimicrons, the light transmittance of the filter according to the invention actually increases a slight amount (as indicated by the reverse bend in the curve D at 600 millimicrons) up to the region of around 630 millimicrons or so, such increased transmittance beyond 600 millimicrons thus serving to raise the relative energy characteristic of the filtered light (curve C in Fig. 3) back up to a level above that of average daylight (curve B) whereby the relative energy characteristic of the filtered light between 490 millimicrons or thereabouts to 700 millimicrons averages out approximately to that of average daylight.

A comparison of the curve C of relative energy from a photoflash lamp transmitted through a film of my lacquer, with the ideal daylight curve B, shows that the energy in the band from 400 m$\mu$ to 490 m$\mu$ is 98.2% of the daylight curve, from 490 m$\mu$ to 590 m$\mu$ it is 100% of the daylight curve, and from 590 m$\mu$ to 670 m$\mu$ it is 99.8% of the daylight curve.

Referring to curve C of Fig. 3, it will be observed that the filter which I provide depresses or lowers the relative energy characteristic of the light produced by the lamp and as transformed by the filter within the green and yellow regions of the spectrum. That is, the characteristic is depressed within the region extending from 490 m$\mu$ to 590 m$\mu$, in order to approximate closely the spectrum of average daylight conditions.

While I have stated a preferred composition, it will be understood that the proportions may be varied somewhat without departing from the spirit of this invention. For example, the proportion of Methyl Violet dye may be increased slightly to raise the right hand end of the curve, i. e., to increase somewhat the transmission of red-orange radiations.

What I claim as new and desire to secure by Letters Patent of the United States is:

1. In combination with a photoflash lamp comprising a transparent envelope containing a flash producing charge a color filter for transforming the light of the lamp to daylight character comprising an iron blue pigment and methyl violet dye in the proportions, by weight, of the order of 25 parts of the iron blue pigment to one part of the methyl violet dye.

2. In combination with a photoflash lamp comprising a transparent envelope containing a flash producing charge, a color filter comprising a blue color material and a violet color material present in combined amounts providing a maximum transmittance for light of a wave-length of approximately 450 millimicrons and a transmittance for longer wave-length light gradually decreasing to the region of and substantially leveling off beyond approximately 600 millimicron wave-length light.

3. In combination with a photoflash lamp comprising a transparent envelope containing a flash producing charge, a color filter comprising a blue color material and a violet color material present in combined amounts providing a maximum transmittance of the order of 80 per cent for light of a wave-length of approximately 450 millimicrons and a transmittance for longer wave-length light gradually decreasing to a value of the order of 35 per cent in the region of approximately 600 millimicron wave-length light and substantially leveling off at said value of 35 per cent beyond the said region of approximately 600 millimicron wave-length light.

4. In combination with a photoflash lamp comprising a transparent envelope containing a flash producing charge, a color filter comprising an iron blue pigment and a violet dye present in combined amounts providing a maximum transmittance for light of a wave-length of approximately 450 millimicrons and a transmittance for longer wave-length light gradually decreasing to the region of and substantially leveling off beyond approximately 600 millimicron wave-length light.

5. In combination with a photoflash lamp comprising a transparent envelope containing a flash producing charge, a color filter comprising an iron blue pigment and methyl violet dye present in combined amounts providing a maximum transmittance for light of a wave-length of approximately 450 millimicrons and a transmittance for longer wave-length light gradually decreasing to the region of and substantially leveling off beyond approximately 600 millimicron wave-length light.

6. In combination, a photoflash lamp comprising a transparent envelope containing a flash producing charge, and a color filter comprising a lacquer on the surface of said envelope and containing a blue color material and a violet color material present in combined amounts providing a maximum transmittance for light of a wave-length of approximately 450 millimicrons and a transmittance for longer wave-length light gradually decreasing to the region of and substantially leveling off beyond approximately 600 millimicron wave-length light.

7. In combination, a photoflash lamp comprising a transparent envelope containing a flash producing charge, and a color filter substantially unaffected by humidity comprising a lacquer on the exterior surface of said envelope formed from a cellulose acetate solution comprising ethyl lactate and including iron blue pigment and methyl violet dye present in combined amounts providing a maximum transmittance for light of a wave-length of approximately 450 millimicrons and a transmittance for longer wave-length light gradually decreasing to the region of and substantially leveling off beyond approximately 600 millimicron wave-length light.

JUNIUS DANA.

REFERENCES CITED

The following references are of record in the file of this patent:

UNITED STATES PATENTS

| Number | Name | Date |
| --- | --- | --- |
| 1,519,448 | Gamain | Dec. 16, 1924 |
| 2,046,388 | Kurlander | July 7, 1936 |
| 2,110,500 | Chiera | Mar. 8, 1938 |
| 2,269,984 | Munder | Jan. 13, 1942 |

Certificate of Correction

Patent No. 2,465,068.  March 22, 1949.

JUNIUS DANA

It is hereby certified that error appears in the printed specification of the above numbered patent requiring correction as follows:

Column 2, line 21, for the word "Kodak" read *Kodal*;

and that the said Letters Patent should be read with this correction therein that the same may conform to the record of the case in the Patent Office.

Signed and sealed this 11th day of October, A. D. 1949.

[SEAL]

THOMAS F. MURPHY,
*Assistant Commissioner of Patents.*